Patented Feb. 17, 1942

2,273,159

UNITED STATES PATENT OFFICE 2,273,159

ISOMERIZATION OF NORMAL PENTANE

Carl O. Tongberg, Westfield, Charles S. Lynch, Fanwood, and Jeffrey H. Bartlett, Cranford, N. J., assignors to Standard Oil Development Company, a corporation of Delaware No Drawing. Application December 29, 1939, Serial No. 311,522

12 Claims. (Cl. 260—676)

This invention relates to the isomerization of straight chain paraffinic hydrocarbons, in particular, normal pentane, to produce isoparaffins, in particular, isopentane, therefrom.

It is known to use Friedel-Crafts type catalysts, for example, halides of Al, Zn, Fe, Ti, etc., as catalytic agents for the isomerization of normal paraffinic hydrocarbons to form branched chain paraffinic hydrocarbons. Ordinarily, these catalysts have been used in conjunction with activators, such as hydrogen chloride, hydrogen bromide, and the like to increase the rate of conversion to the desired isomers. Ipatieff and Grosse in "Industrial & Eng. Chemistry," vol. 28 (1936), pages 461 through 464, describe a series of experiments in which normal butane was contacted with aluminum chloride and hydrogen chloride in a rotating autoclave of about 800 cc. capacity, the aluminum chloride being placed in a glass liner and the normal butane being maintained in the liquid phase. Temperatures as high as 350° F., were employed to effect an isomerization of the normal butane. However, at the high temperatures, considerable decomposition occurred with the formation of high and low boiling hydrocarbons as well as isobutane. In processes such as that described above, the concentrations of catalyst have been as high as 50% based on the hydrocarbon feed. Furthermore, considerable amounts of degradation of catalyst and hydrocarbon feed have been noted. The aluminum chloride, for example, which may be employed as the catalyst in these processes, becomes hydrated, united to form sludge, or in other ways degraded to the point where it is no longer useful as the catalyst. Furthermore, by reason of the fact that such high temperatures are employed, the degradation of the catalyst and of the feed stock occurs rapidly. The yield of desired isomers is accordingly materially decreased considering the amount of feed originally contacted with the catalyst.

As compared with the isomerization of normal butane, normal pentane presents an entirely different problem. Reaction conditions, particularly temperature and time, are relatively mild compared to the conversion of normal butane to isobutane. This in part results because of the fact that normal pentane can isomerize or crack to a greater variety of products than normal butane, because normal pentane requires less energy for activation and because compared to the ease of isomerization, the ease of cracking is much greater for normal petane than for normal butane. Higher temperatures in particular are detrimental to the isomerization of normal pentane since there is increased cracking of the normal pentane. As a result it has not in the past been possible to obtain high yields of isopentane without experiencing excessive degradation although it is known to isomerize normal pentane to produce isopentane at room temperatures in the presence of aluminum chloride and hydrogen chloride. However, the degree of conversion is only about 40% whereas the side reactions take place to a large extent. In the case of the isomerization of normal butane, the ease of isomerization is more difficult using the same catalyst and promoter than in the case of normal pentane, but fewer side reactions occur in carrying out the process. According to the present invention, normal pentane is isomerized to isopentane to a high conversion, that is, of the order of about 70–80% with a minimum amount of cracking of the normal pentane.

It is an object of the present invention to produce hydrocarbon mixtures containing predominating amounts of isopentane from normal pentane by subjecting normal pentane to isomerization conditions which are carefully controlled with respect to catalyst concentration, catalyst particle size, degree of agitation of the reaction mixture, temperature, concentration of hydrogen chloride, etc. The various reaction conditions are correlated so as to obtain optimum yields of isopentane from normal pentane.

It is a further object of the invention to effect high conversions of the normal pentane into isopentane with a high degree of selectivity so as to prepare a product predominating in isopentane and which may be used directly as a blending agent for aviation fuel.

It is still a further object of the invention to carry out a continuous process for the isomerization of normal pentane to isopentane in such a manner as to maintain a minimum catalyst degradation per unit of normal pentane isomerized.

In order to accomplish these objects, as well as others which will become apparent from a full understanding of the invention to be more fully hereinafter described, normal pentane is subjected to isomerization in the presence of an aluminum halide promoted by substantial quantities of hydrogen halides under the following reaction conditions. Aluminum chloride or aluminum bromide is maintained in a reaction zone in a concentration of at least 100% by weight based on the total hydrocarbons present in a reactor at any one time. The concentration of the aluminum halide may be increased up to as high as 160% or even higher, that is, up to 200%. However, the upper limit of concentration of the catalyst present in the reactor is governed largely by the existing commercial equipment which may be employed for carrying out the reaction since it is necessary for an efficient operation to have the reaction mixture intensively agitated. Concentrations of catalyst above 160% are less desirable for the reason that the slurry formed in such instances becomes difficult to stir and as the catalyst concentration is increased beyond this point, adequate agitation of the reaction mixture becomes almost impossible due to the high solid to liquid ratio of the reaction mixture.

The particular size of the catalyst is preferably maintained at at least 20 mesh. However, even more finely divided catalyst may be employed, for example, up to about 200 mesh. It has been found that the increased surface of the catalyst materially aids in an efficient isomerization reaction. The temperature of the reaction may be maintained between about 30 and about 100° F. Temperatures lower than 30° F. may be employed but in such instances a longer time of contact of the normal pentane with the catalyst is required in order to effect substantially the same degree of conversion. The reaction time is between about ¾ and about 20 hours depending upon the other reaction conditions.

The hydrogen halide employed as an activator or promoter for the reaction may be either hydrogen chloride, hydrogen bromide or hydrogen fluoride. It is employed in amounts ranging between about 3 and about 22% by weight based on the amount of hydrocarbon present in the reactor at any one time. It is preferable to employ about 18% by weight of the hydrogen halide activator since this amount represents the quantity of hydrogen halide dissolved in the hydrocarbon medium in the reactor under the other reaction conditions obtaining. In general, the hydrogen halide is introduced into the reactor under superatmospheric pressure. After the pressure of the reactor has reached between about 40 and about 250 lbs./sq. in. gauge, the supply of hydrogen halide to the system is shut off.

It has been found to be highly desirable, in order to obtain efficient isomerization, to maintain the reaction medium in a state of vigorous agitation. In general, the better the agitation of the reaction medium, the higher the yield of isopentane.

The above described reaction conditions are necessarily correlated with respect to one another so as to produce high yields of isopentane with a minimum amount of time elapsing between the time of introduction of the normal pentane into the reactor or into a series of reactors and the time of withdrawal of the reacted mixture from the system. In general, the use of high temperatures for the reaction mixture permits the time of reaction to be materially reduced. On the other hand, however, if low temperatures are employed, longer periods of residence of the normal pentane in the reactor are required. It has been found that in order to avoid cracking of the normal pentane, it is preferable to employ high concentrations of the aluminum halide. In order to speed up the reaction, and in order to place it on a commercial basis, fairly high concentrations of the promoter are required although it is within the scope of the present invention to employ low concentrations of hydrogen halide promoter. This is especially desirable where the increase in reaction time is not detrimental to the ultimate commercial success of the process.

The invention is not limited to the use of substantially pure normal pentane as the feed stock. Any paraffinic $C_5$ hydrocarbon mixture containing isomerizable amounts of n-pentane may be employed. For example, a mixture of 40% normal and 60% isopentane may be employed although the effectiveness of the process would be considerably less in such an instance. A refinery $C_5$ paraffinic cut containing relatively small amounts of other hydrocarbons, containing $C_4$ and/or $C_6$ paraffins but relatively free of olefins may also be employed provided the composition contains more than 10%, preferably more than 40%, of normal pentane.

The reacted mixture, upon being discharged from the reactor or series of reactors, is subjected to a fractional distillation in cases where it is desired to obtain substantially pure isopentane. The hydrogen halide coming off as overhead from the fractionating column may then be returned to the isomerization zones and the mixture of normal pentane and isopentane may then be treated with caustic to remove the last traces of promoter and, if desired, subjected to fractional distillation to substantially separate the isopentane from the normal pentane. The unreacted normal pentane may then be recycled to the original isomerization zone and the isopentane may be employed in any number of desirable ways. If desired, however, the caustic treated normal pentane-isopentane mixture may be employed directly in any suitable manner. For example, it may be employed as a feed stock to an alkylation unit, it may be catalytically dehydrogenated and either fed to an alkylation unit or to a polymerization unit, or the resultant normal pentane-isopentane mixture may be employed directly as a blending agent in gasolines, in particular, aviation gasolines, since this hydrocarbon mixture has a particularly high octane number, usually of the order of about 75 to 85, or higher, measured by the A. S. T. M. method.

The isomerization reaction, according to the present invention, is carried out in the liquid phase. The type of apparatus employed may consist of a single reactor equipped with an efficient stirring device, for example, a mechanical agitator, such as a motor driven propeller, jets of restricted internal diameter, turbo mixers and the like. The reaction may be carried out in either a single reactor or in a series of reactors. Where a series of reactors are employed, the various stages of the reaction may be more carefully controlled and the reaction during the course of its progress toward completion may be controlled with a greater flexibility and with a corresponding economy in operation due to the fact that the temperatures, rates of throughput, and the like, may be accurately controlled with respect to each stage of the reaction. Thus, the first of a series of three reactors connected in series may be maintained at a temperature of, say, 100° F. The second reactor may be maintained at a temperature of around 50 or 60° F. and the third reactor may be maintained at a temperature around 30° F. The length of residence in the reactors would correspondingly be about ½ hour in the first reactor, about 1 hour in the second reactor, and about 5 hours in the third reactor. By employing such a series of reactors under the above-described conditions, it is possible to attain a conversion of normal pentane to isopentane in between about 75 and 85% with a minimum amount of degradation products formed.

The catalyst in either a single or multiple stage reaction system may be held in the reactor by employing a suitable screen or filter at the point of discharge of the reacted or partially reacted hydrocarbon mixture. A Cuno filter is desirable to employ for this purpose. In cases where the catalyst employed has a relatively large particle size and wherein the rate of throughput of the normal pentane is fairly slow, the intensity of agitation being constant, it is possible to carry out the process of the present invention in such a manner as to obviate the necessity for employing a filter. This is particularly true where the feed stock enters the reactor at the bottom and leaves the reactor at or near the top. Very little of the catalyst is carried over by such an operation. One of the advantages of the present invention lies in its application in a continuous operation wherein the catalyst degradation is maintained at a minimum in contrast to the use of a series of batch operations employing the partially spent catalyst from a preceding batch operation, in which the degree of catalyst degradation may be found to be excessive due to the fact that all of the hydrocarbons are not removed from contact with the catalyst at periods between the various batch operations. In a continuous process, such difficulties are minimized.

In order to more fully disclose the invention, the following examples are given to indicate the nature of the invention. However, it should be distinctly understood that the following examples are presented merely as illustrative of rather than limitative to the specific types of operation of the invention. In Table I, which presents the pertinent data from a series of 9 runs, the method of operation was as follows: Normal pentane was charged to a closed container maintained at the stated reaction temperature and containing the desired amount of aluminum chloride, an amount of dry hydrogen chloride was pressed into the reactor sufficient to give a gauge pressure of from about 200 to about 210 lbs./sq. in. This amounted to about 18% by weight of promoter dissolved in the hydrocarbons based on the total hydrocarbons in the reactor at any one time with between 3 and about 6% hydrogen chloride remaining undissolved therein. The reaction was carried out for the required length of time. The reacted hydrocarbon mixture was withdrawn, fractionally distilled, and the volume of isopentane determined for computing the percentage by volume yield of isopentane based on the total normal pentane charged.

was accomplished by the use of a turbo mixer. Example 1 through 8 employed a powdered aluminum chloride having a particle size of about 40 mesh as the catalyst. The catalyst employed in Example 9 was the conventional lump aluminum chloride of commerce. The product of Example 3 was debutanized and the resultant product containing normal pentane and a predominating amount of isopentane was found to have an octane number of about 85 measured by the A. S. T. M. method.

From a study of the data presented in Table I, it is apparent from a comparison of Examples 1, 2 and 3 that a catalyst concentration of at least 100% by weight based on the total hydrocarbons present in the reactor at any one time produced unexpectedly high yields of isopentane with unexpectedly high selectivity of the product so produced. In the case of the use of 100% catalyst concentration, a yield of 77 volume percent of isopentane was obtained based on the originally charged normal pentane. It was found that 94.5 volume percent of the reacted normal pentane was isopentane. Upon using 150% catalyst concentration, isopentane was obtained in an 80% yield with a 97% selectivity.

Examples 2, 4 and 5 indicate that the more vigorous the agitation of the reaction mixture the higher the yield and selectivity to be attained. Example 4 was carried out involving no agitation of the reaction mixture. Example 5 was carried out using mild agitation and Example 2 was carried out using vigorous agitation. These three runs were made on a directly comparable basis since all other reaction conditions were maintained constant, the only variable being the degree of agitation of the reaction mixture.

Examples 6, 7, 2 and 8 represent the data obtained by maintaining all reaction conditions constant except the temperature and time of reaction. They show that upon using a low temperature, that is, a temperature of around 40° F., it is necessary to permit the reaction to run for about 18 hours in order to get substantially the same yields as are obtained when employing a temperature of about 95° F. for a total reaction time of about 1 hour.

A comparison of Examples 5 and 9 indicates that the use of powdered catalyst is highly desirable for effecting increased yields of isopentane with a minimum amount of side reactions taking place during the reaction.

In a commercial type of operation employing a continuous unit for carrying out the reaction, it may be desirable to employ temperatures of 100°

Table I

| Examples | Temp., °F. | Percent by weight on total H. C. cat. conc. | Time, hours | Agitation | Volume percent yield of isopentane | Selectivity vol % isopentane / vol % n-pentane reacted |
|---|---|---|---|---|---|---|
| 1 | 78 | 75 | 2 | Vigorous | 64 | 75.5 |
| 2 | 78 | 100 | 2 | do | 77 | 94.5 |
| 3 | 78 | 150 | 3.5 | do | 80 | 97 |
| 4 | 78 | 100 | 2 | None | 29 | 81 |
| 5 | 78 | 100 | 2 | Mild | 66 | 88 |
| 6 | 39 | 100 | 18 | Vigorous | 79 | 100 |
| 7 | 60 | 100 | 5 | do | 75 | 96 |
| 8 | 95 | 100 | 1 | do | 81 | 99 |
| 9 | 78 | 100 | 2 | Mild | 19 | 45 |

The mild agitation which was employed in Examples 5 and 9 was accomplished by the use of a shaker pressure bomb. The vigorous agitation employed in the other examples, with the exception of Example 4 which employed no agitation F., or even higher, and permit the length of time for the normal pentane in the isomerization reactor to not exceed 30 or 40 minutes since apparently the higher temperatures permit the use of much shorter contact times.

Having now thus fully described and illustrated the character of the invention, what is claimed as new and useful and desired to be secured by Letters Patent is:

1. A process which comprises contacting a $C_5$ paraffinic hydrocarbon composition containing more than 10% of normal pentane with at least 100% by weight of aluminum chloride based on the total hydrocarbons present in the isomerization reactor at any one time in the presence of at least one hydrogen halide, vigorously agitating the reaction mixture maintained at a temperature of at least 30° F. while maintaining the temperature sufficiently low to insure liquid phase operation for a period of time sufficient to effect at least a 60% by volume yield of isopentane based on the normal pentane charged.

2. A process which comprises contacting normal pentane with aluminum chloride sufficiently finely divided to pass through at least a 20 mesh screen and present in the reaction chamber in an amount of at least 100% by weight based on the total hydrocarbon present in the reactor at any one time in the presence of at least one hydrogen halide present in an amount between about 3 and about 22% by weight based on the total hydrocarbons in the reaction chamber at any one time, maintaining the reaction chamber at a temperature between about 30 and about 100° F., vigorously agitating the reaction mixture for a period of time between about ¾ and about 20 hours and withdrawing the reacted mixture.

3. A process which comprises reacting normal pentane in contact with about 100% by weight of aluminum chloride in the presence of a hydrogen chloride pressure of between about 40 and about .250 lb./sq. in. gauge, maintaining the reaction mixture at a temperature of about 78° F., vigorously agitating the reaction mixture for a period of about 2 hours and recovering isopentane from the reaction mixture.

4. A process which comprises reacting normal pentane in the presence of powdered aluminum chloride in a concentration of about 150% by weight based on the total hydrocarbons present in the reactor at any one time in the presence of HCl, maintaining the reaction mixture at a temperature of about 78° F. for a period of about 3½ hours with vigorous agitation of the reaction mixture and withdrawing the isopentane so formed.

5. A process as in claim 1 in which the reaction is carried out continuously.

6. A process as in claim 1 in which the reaction is carried out in a plurality of reaction zones.

7. A process as in claim 2 in which the neutralized reaction mixture is directly introduced as a blending agent into an aviation gasoline.

8. A process as in claim 2 wherein the catalyst is continuously contacted with normal pentane and wherein the isomerized normal pentane is continuously withdrawn therefrom.

9. A process which comprises isomerizing normal pentane in the presence of about 100% by weight of aluminum chloride based on the total hydrocarbons present in the reaction zone at any one time in the presence of about 18% by weight of dissolved hydrogen chloride, maintaining the reaction temperature at about 95° F. for no more than about 1 hour with vigorous agitation and withdrawing the reacted hydrocarbon mixture.

10. A process as in claim 9 wherein the reaction is carried out continuously.

11. A process as in claim 1 wherein the hydrocarbon composition contains more than 40% of n-pentane.

12. A process as in claim 9 wherein the reacted mixture is fractionally distilled, the hydrogen chloride and unreacted normal pentane returned to the reaction zone, and the isopentane removed from the system.

CARL O. TONGBERG.
CHARLES S. LYNCH.
JEFFREY H. BARTLETT.